US006441816B1

(12) United States Patent
Nguyen et al.

(10) Patent No.: US 6,441,816 B1
(45) Date of Patent: Aug. 27, 2002

(54) METHOD FOR MODELING AND RENDERING COMPLEX SURFACES USING LOCAL HEIGHT MAPS

(75) Inventors: Hoanganh Nguyen, Cupertino, CA (US); Tim Poston, Singapore (SG); Martin Lee Brady, Phoenix, MD (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,337

(22) Filed: Dec. 29, 1999

(51) Int. Cl.$^7$ ............................................. G06T 17/00
(52) U.S. Cl. ....................... 345/420; 345/421
(58) Field of Search .......................... 345/420, 418, 345/419, 421, 582, 615; 382/307, 282, 300

(56) References Cited

U.S. PATENT DOCUMENTS

| 5,621,827 A | * | 4/1997 | Uchiyama et al. | ........... 382/307 |
| 5,872,902 A | * | 2/1999 | Kuchkuda et al. | ........... 345/615 |
| 5,920,319 A | * | 7/1999 | Vinning et al. | ............. 345/420 |
| 5,982,378 A | * | 11/1999 | Kato | ........................... 345/582 |

OTHER PUBLICATIONS

D.W. Paglieroni & S.M. Petersen, "Height Distributional Distance Transform Methods for Height Field Ray Tracing", ACM Trans. on Graphics, vol. 13, No. 4, pp. 376–399, Oct. 1994.

D. Cohen–Or, E. Rich, U. Lerner, & V. Shenkar, "A Real–Time Photo–Realistic Visual Flythrough", IEEE Trans. on Visualization & Computer Graphics, vol. 2, No. 3, pp. 255–265, Sep. 1996.

R.L. Cook, "Shade Trees", Computer Graphics, vol. 18, No. 3 pp. 223–231, Jul. 23–27, 1984.

R.L. Cook, L. Carpenter & E. Catmull, "The Reyes Image Rendering Architecture", Computer Graphics, vol. 21, No. 4, Jul. 1987, pp. 95–102.

J.F. Blinn, "Simulation of Wrinkled Surfaces", Computer Graphics SIGGRAPH' 78 proc.) vol. 12, No. 3, pp. 286–292, Aug. 1978.

F. Kenton Musgrave, "Grid Tracing for Rendering Height Fields", dissertation, Chapter 3 Yale University 1993, pp. 65–81.

* cited by examiner

*Primary Examiner*—Cliff N. Vo
*Assistant Examiner*—Huedung X. Cao
(74) *Attorney, Agent, or Firm*—Blakely, Sokoloff, Taylor & Zafman LLP

(57) ABSTRACT

A method of modeling and rendering a three-dimensional complex surface using a triangle mesh is disclosed. The method can reduce memory requirement and rendering time by using local height maps and by assigning neighborhood coordinates to any point on a surface near the triangle mesh assigned to that surface. Barycentric coordinates are used to identify points in a triangular polygon to work with height data in the local height map associated with that triangular polygon. The local height maps allow collision detection of a ray with the three-dimensional surface. Lipshitz constants associated with the three-dimensional surfaces are used to find a point on the next ray closest to the three-dimensional surface to jump to, making the search for such collision points efficient.

60 Claims, 11 Drawing Sheets

(a)

(b)

(c)

(d)

(a)

(b)

(c)

(d)

METHOD FOR MODELING AND RENDERING COMPLEX SURFACES USING LOCAL HEIGHT MAPS

FIELD OF THE INVENTION

The present invention relates to the field of computer graphics. In particular the present invention discloses a method and apparatus for modeling and rendering three-dimensional surfaces.

BACKGROUND OF THE INVENTION

An object is commonly represented in computer graphics by a mesh of polygonal facets with the connected polygons sharing edges and vertices. These may be derived from more algebraically complex surface representations, but creation of an actual image usually goes through a mesh representation. The facets are an approximation to the curved surfaces of such object. The polygon mesh forms the exterior of the object. The accuracy of the model, or the difference between the faceted representation and the curved surface of the object to be represented, depends on many factors, and the intended use. For example, a picture of the object usually requires less accuracy than an engineering specification of it. Where the curvature changes rapidly, more polygons are required per unit area of the surface. Complex surfaces often require tens or hundreds of thousands of polygons to be represented in this manner. A polygon mesh structure consists of many vertices with their (x,y,z) coordinates, and polygons which share these vertices. More simply but less efficiently, each polygon may have the (x,y,z) coordinates of its vertices listed directly.

For an object to be drawn, the model must contain not only a mesh structure hut information about the normal direction at each point which affects how it meets light, the light-scattering properties, and the color. Typically, the color is specified either by fixing a color at each vertex, and for the other points on each polygon interpolating between its vertices, or by specifying for each vertex a position in a buffered image or '2D texture'. For other points of each polygon these positions are interpolated, and the color read from the 2D texture.

Another method to render surfaces is bump mapping. Bump mapping is a technique to enable representation of a wrinkled or dimpled surface without the need to model these depressions geometrically. Using information given in a two-dimensional bump map, this technique tricks a local reflection model into producing local variations on a smooth surface. This technique defines a map of normal vectors across the surface of the polygons. Normal vectors are used to represent the orientation of a surface when comparing with the direction of the light. Such a comparison is used in shading models to compute the intensity of the light reflected from a matte (uniform scattering) surface. The smaller the angle between the light vector and the vector that is normal to the surface. the higher is the intensity of the light received by and therefore scattered from the surface. The normal vectors for the vertices can be computed directly from the neighboring surface normals by various averaging techniques, but it is more usual to include normals (obtained by a variety of methods) in the data structure than to recompute them for each image. 'Shiny' surfaces, reflecting light more strongly in the direction that a mirror would, require also comparisons of the direction with the eye's direction of viewpoint.

In bump mapping, normals assigned according to position in the polygon, giving a point in a 2D map of normals analogous to 2D texture coloring, are used to modify the lighting of the rasterized points to simulate surface variation. However they do not capture the position of surface points correctly. Bump mapping works best for polygons that are perpendicular to the viewing direction; those seen at an oblique angle do not display the correct silhouette.

SUMMARY OF THE INVENTION

In one embodiment, a method and apparatus for modeling a three-dimensional surface is disclosed. A polygon mesh approximates the three-dimensional surface. Each polygon of the polygon mesh contains a plurality of footpoints. A normal vector is associated with each vertex of the polygons. An interpolated normal is associated with each footpoint with the interpolation based on the vertex normals of the polygon containing the footpoint. Each point on the three-dimensional surface is represented by a height datum given as a function of a footpoint on a polygon. The height datum represents a distance along an interpolated normal from the footpoint to the point on the surface.

BRIEF DESCRIPTION OF THE DRAWINGS

The objects, features and advantages of the present invention will be apparent from the following detailed description of the preferred embodiment of the invention with references to the following drawings.

DETAILED DESCRIPTION

Figure 1:
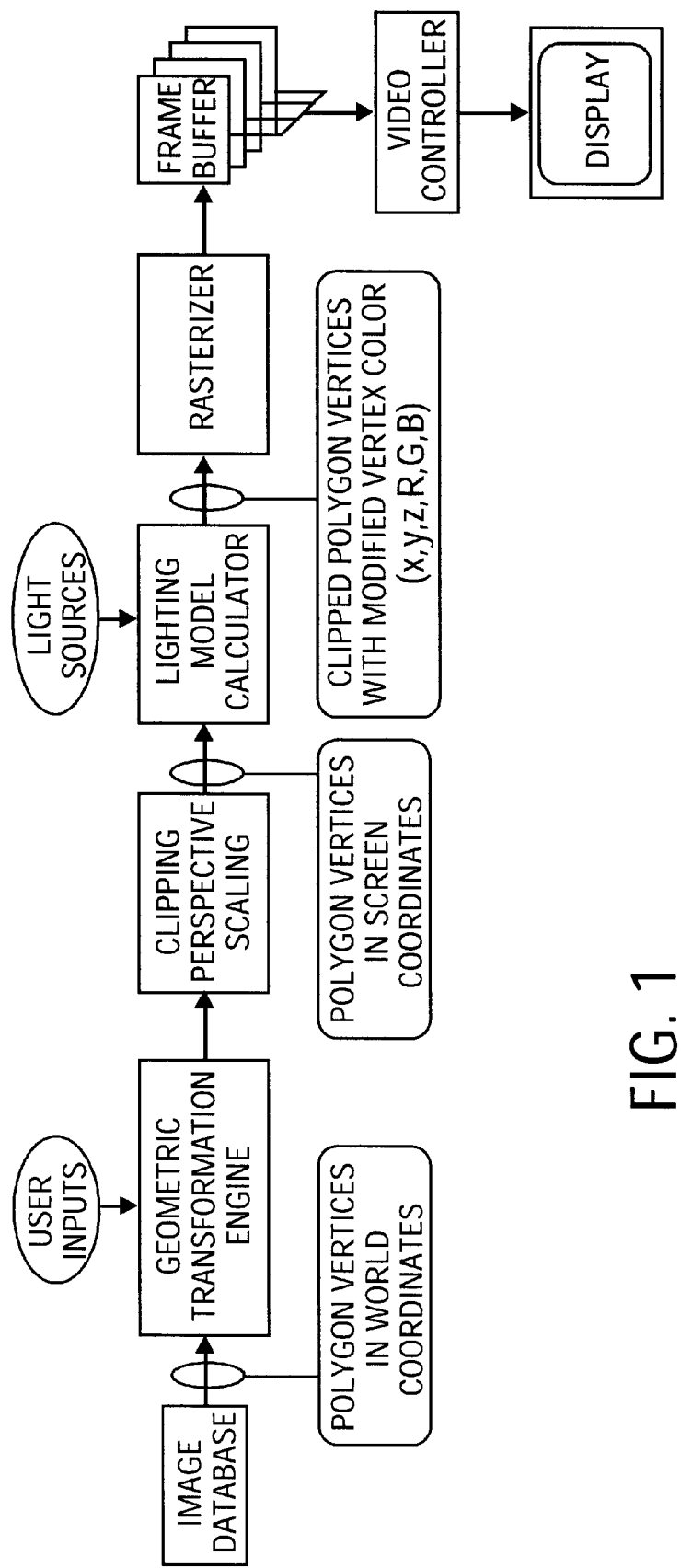
FIG. 1 illustrates a typical graphics pipeline with the geometry phase and the rasterization phase.

A method and apparatus for modeling and rendering 3D surface is disclosed. In the following description, for purposes of explanation, specific nomenclature is set forth to provide a thorough understanding of the present invention.

However, it is apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored. transferred, combined, compared, and otherwise manipulated. It has proven convenient At times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs). random access memories (RAMs), EPROMs, EEPROMs, magnetic or optical cards or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a typical graphics pipeline with a geometry phase and a rasterization phase. In the geometry phase, the polygon vertices in the (x,y,z) model coordinates are taken as input data, along with the position and orientation of the model. These vertices are then transformed according to the said position. Once transformed, lighting calculations are applied to each vertex. Then, these vertices are projected to the screen, transforming them from a three-dimensional (3D) representation to two-dimensional (2D) representation. During the rasterization phase, each pixel coordinate is located and assigned an intensity value, using color or texture interpolation. The interior points of each polygon are rasterized from the transformed, shaded vertices and blended into the frame buffer. The geometry phase is often performed in the central processing unit (CPU). The rasterization phase is often performed by dedicated hardware devoted entirely to the rasterization process.

This is most efficient for simple surfaces since the polygons are relatively large, resulting in fewer polygons and thus, a smaller number of vertices and vertex coordinates. In this case, a smaller number of CPU cycles is required to perform the transformation, leaving most of the remaining rendering work to be performed by the rasterization step. However, when representing curved 3D surfaces, the size of the polygons decreases, since we need more polygons to provide adequate approximation. For example, six polygons can probably represent a cube perfectly, but to represent a sphere requires hundreds of polygons, and to represent a skull requires tens of thousands of polygons. This raises the overall total number of polygon vertices. The average number of rasterized points per vertex also decreases. This shifts the rendering burden back into the geometry phase and the CPU. The rasterization hardware is thus left underutilized while the CPU performs the vertex transformations. The large number of vertices transformed in the geometry phase by the CPU causes the system to carry a large amount of data through subsequent phases of the rendering process, increasing the bandwidth requirements. In addition, smoother surface approximations require a larger number of polygons. Thus, any rendering techniques that rely on fine polygonal mesh geometry for the display of true geometric detail come with great cost in data size and in rendering time.

Figure 2:
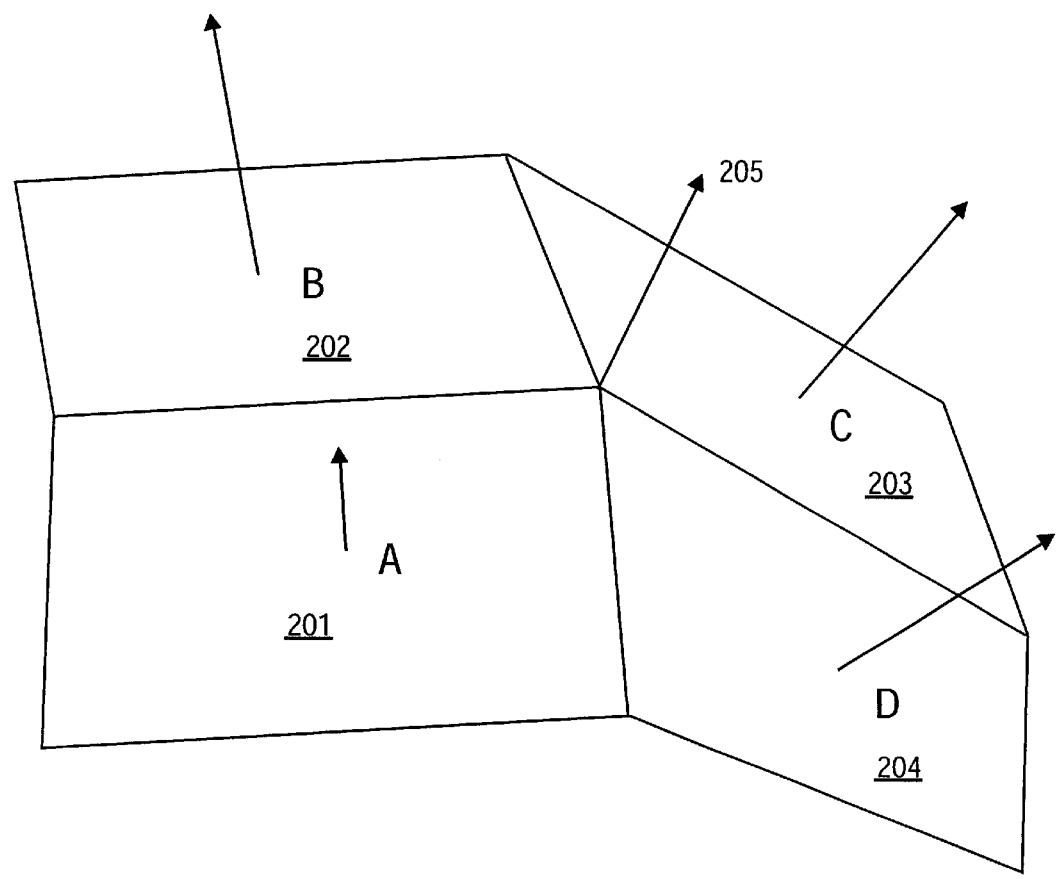
FIG. 2 illustrates surface normals and a vertex normal.

FIG. 2 illustrates the normal vector at a vertex where several flat polygons 201, 202, 203 and 204 meet. These polygons possess true geometric normals. The vector 205 is not perpendicular to anything in the figure. The vector 205 may be perpendicular to the curved surface the mesh is intended to approximate, otherwise derived from relevant data, or interpolated by one or another averaging process from the surrounding geometric normals, but as part of the data structure of the model it is customary to refer to it as a 'vertex normal'. In simple forms of shading, normals interpolated between these vertex normals are used for points within a polygon.

Modeling

To maintain a smooth representation of 3D surfaces, the present invention uses a polygonal mesh, with each polygon of the mesh constructed to approximate a surface segment. In our preferred implementation, the polygons are triangles. Instead of defining a shape by a large number of small polygons, the present invention represents the shape by a small number of large polygons and defines on each polygon a height function that recovers the surface details. An embodiment of the present invention is hereinafter described in detail with reference to the accompanying drawings.

A 3D surface can be divided into one or multiple surface segments. Using the technique of the present invention, one polygon is assigned to each surface segment. A local height map is associated with each such polygon, with the height map containing a height datum for each corresponding point on the surface segment. In one embodiment this may be stored in the form of a procedure, such as the evaluation of a spline or wavelet or other parametrized function at the point, In another embodiment, this may be stored in the form of a lookup array of values at a grid or other sampling of points, with interpolation rules such as, for example, biquadratic interpolation, 'pick the nearest', and so forth, as familiar to those skilled in the art.

The height datum is the distance from a point on the polygon surface to a point oil the surface segment along an interpolated normal. In most mesh approximations of a smooth surface, 'normals' are often explicitly specified at the vertices. For any point on the surface of a polygon, rather than use the geometric normal to the triangular polygon, it is common for the lighting calculation to use a 'normal' that is interpolated between the values at its vertices. Where the polygon is a triangle, there is a unique linear fit that can be used for interpolation. If the polygons are more complex, one may use polynomial approximators such as, for example, splines, or—as many rendering engines do—break each polygon into triangles and interpolate linearly on each.

Thus, if the vertex normals of each polygon of a 3D surface are all on the same side of the polygon, there is a neighborhood in which points on the 3D surface can be identified one-for-one with the normal bundle coordinates of points on the polygon surface and the distances from the points on the triangular polygon surface to the points on the 3D surface in the direction of the interpolated normals. The distances are stored in local height maps associated with the appropriate polygon. Care is necessary in the formulation of these local height maps in order to avoid gaps or discontinuities between adjacent polygons.

The expression "distance along an interpolated normal" may refer either to Euclidean distance in the direction of that normal, or to the number by which that normal vector must be multiplied to give the separation between the point on the polygonal surface and the point on the represented surface. In a preferred embodiment, the latter meaning is used, and the interpolated normal is not adjusted to unit length, so that the height data are not Euclidean distances.

Figure 3A:
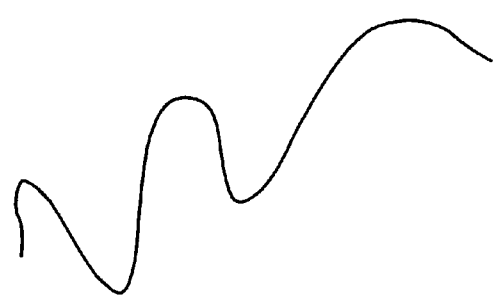
FIG. 3A illustrates a two-dimensional analogue of a complex three-dimensional surface.
Figure 3B:
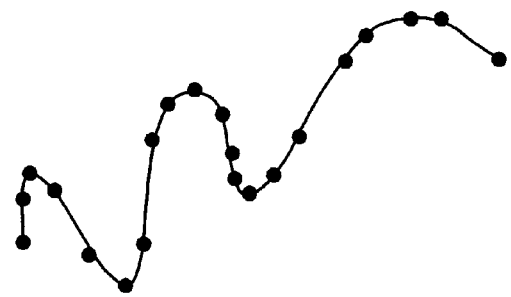
FIG. 3B illustrates a two-dimensional analogue of a complex three-dimensional surface represented by line segments.
Figure 3C:
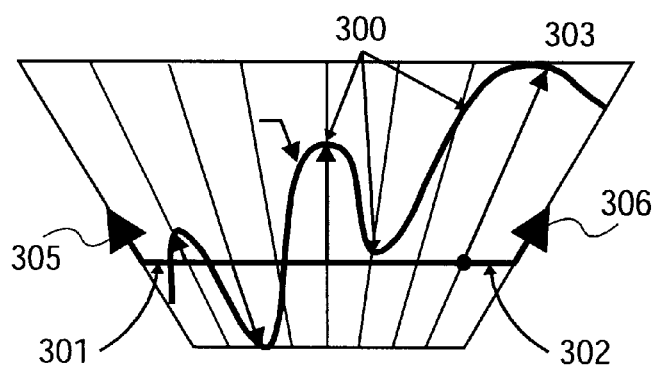
FIG. 3C illustrates a complex three-dimensional surface represented by the technique of the present invention using a polygon and height data.

FIG. 3A illustrates a two-dimensional representation of a three-dimensional complex surface. Traditionally, a complex surface is approximated by using multiple polygonal facets. The more polygon facets used, the closer the approximation to the actual surface. FIG. 3B illustrates in two dimensions the complex surface approximated by multiple line segments. Each line segment stands in analogy to a polygon. FIG. 3C illustrates a two-dimensional view of the complex surface 300 being represented with a single polygon 301. A point 303 on the surface 300 is represented by a combination of a footpoint 302 on polygon 301 and a height datum. At footpoint 302 a normal is interpolated between vertex normals 305 and 306 (representing the three or more vertex normals of a polygon, by the 2D analogy). The height data are represented as the distance along the interpolated normal from the footpoint 302 to the point 303, in units that treat the interpolated normal 305 as of length 1. Alternatively absolute units, using a rotation-invariant measure of distance, may be used. The height datum is positive if the point 303 is above the polygon 301, negative if the point 303 is below the polygon, and equal to zero if the point 303 is on the plane of polygon 301. In the case where every polygon is a triangle, every footpoint lying inside it can be uniquely defined using the barycentric coordinate system. In the case of more general polygons, every interpolation scheme used in current graphical practice has an extension to the interpolation of normals and the labeling of footpoints, analogous to our use of barycentric coordinates, which is obvious to one skilled in the art. We therefore describe our method in detail for this coordinate system, but can apply it in multiple ways to other polygonal forms.

Consider three points $p_0$, $p_1$, and $p_2$ forming the three vertices of a triangle. In barycentric coordinates, if $c_0$, $c_1$, and $c_2$ are scalars such that $c_0+c_1+c_2=1$, then a point f defined by $f=c_0p_0+c_1p_1+c_2p_2$ is a point in the plane passing through by $p_0$, $p_1$, and $p_2$. The point f lies within the triangle if $0 \leq c_0, c_1, c_2 \leq 1$. If any of the $c_0, c_1$ and $c_2$ is less than zero or greater than one, then the point f is outside the triangle. If any of the $c_0$, $c_1$, and $c_2$ is equal to zero, then the point f lies on the edge of the triangle opposite to $p_0$, $p_1$, or $p_2$ respectively. The scalars $c_0$, $c_1$, and $c_2$ are the barycentric coordinates of the point f.

Figure 4A:
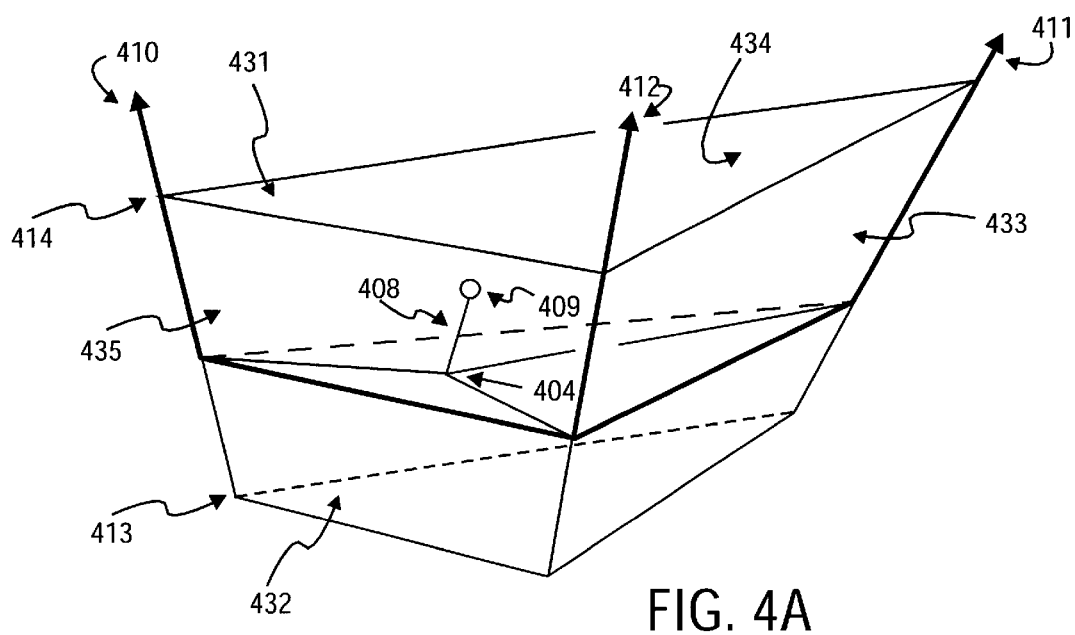
FIG. 4 illustrates a triangular polygon prism space bounded by vertex normals and the maximum and minimum height data of a surface.
Figure 4B:
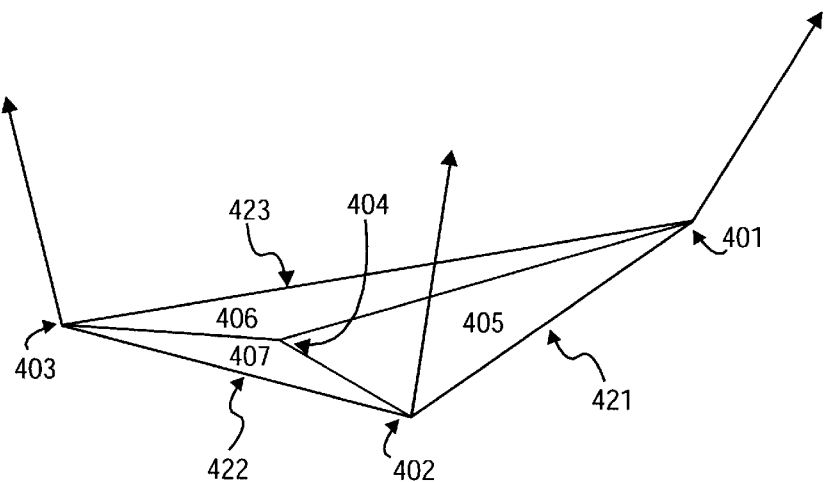

FIG. 4B illustrates a triangular polygon with three vertices 401, 402 and 403. Each of the vertices is stored in the world coordinate (x, y, z) system. FIG. 4B illustrates sub-triangles 405, 406 and 407 created by the line segments from the vertices to a footpoint 404, which may be any point in the triangle. The barycentric coordinates of a footpoint 404 are represented as a function of the object or world coordinates of the three vertices and the three scalars representing the ratio of each of the areas of the three sub-triangles 405, 406 and 407 over the area of the entire triangle. Referencing FIG. 4B, if f is the footpoint 404, $p_0$, $p_1$ and $p_2$ are the three vertices 401, 402 and 403 respectively, represented in object or world coordinates, or in any linear transformation of these coordinates, and $a_0$, $a_1$ and $a_2$ are the areas of the three sub-triangles 405, 406 and 407 respectively and $a=a_0+a_1+a_2$, then the barycentric coordinates of the footpoint f on the face of the triangular polygon is represented as:

$$f=c_0p_0+c_1p_1+c_2p_2 \tag{1}$$

where $$c_0+c_1+c_2=1, \tag{2}$$

and where $c_0=a_0/a$,
$c_1=a_1/a$,
$c_2=a_2/a$.

This reference to areas is for clarity in explanation, faster means of solving (1) and (2) for $c_0$, $c_1$, and $c_2$ are well-known to those skilled in the art. Referencing FIG. 4A, height datum 408 represents the distance from the footpoint 404 to a point 409 along an interpolated normal on the 3D surface. If P is any point in space, such as the surface point 409, h is the height datum 408, $n_0$ is the vector normal 410, $n_1$ is the vector normal 411 and $n_2$ is the vector normal 412, then P is represented as:

$$p=f+h(c_0n_0+c_1n_1+c_2n_2)=c_0p_0+c_1p_1+c_2p_2+h(c_0n_0+c_1n_1+c_2n_2)=c_0(p_0+hn_0)+c_1(p_1+hn_1)+c_2(p_2+hn_2) \tag{3}$$

This represents P in the barycentric coordinates of the triangle consisting of points at height h. When the value of h is found by solving the cubic equation $$\text{Determinant}(P-(p_0+hn_0), P-(p_1+hn_1), (p_2+hn_2))=0 \tag{4}$$

and selecting the appropriate root, equation (3) may be solved as a linear equation in $(c_0, c_1, c_2)$. Thus, in particular, for an arbitrary point P on a ray along which we are searching for the point where it hits the surface, the values for $c_0$, $c_1$, $c_2$ and h can be determined.

Associated with each polygon are a minimum height datum and a maximum height datum. The minimum height datum value is less than or equal to the maximum height datum. These height data are chosen such that for each footpoint within the polygon, exactly one point P on the surface has a representation of the form of equation (3) where h is within this range. FIG. 4A illustrates the minimum height datum 413 and the maximum height datum 414. The minimum height datum 413 and the maximum height datum 414 may be chosen as the maximum and minimum height datum that work for all the individual polygons. Alternatively, they may be chosen as the maximum height datum and minimum height datum for each polygon in the data structure. These two values must be lower than or level with the lowest point on the surface and higher than or level with the highest point on the surface respectively, in reference to the polygon being used for the approximation of the surface segment. The maximum and minimum height data can be negative or positive.

The collection of all points as shown in FIG. 4A is referred to as a Sub-bundle in the polygon for a surface segment. The polygon is referred to as a footpoint polygon, or in the case of our preferred embodiment, it is referred to as it footprint triangle. The collection of all points as shown in FIG. 4A for a given footprint triangle, and with minimum height datum and maximum height datum bounds, resembles a triangular prism, except that the sides are twisted. In one embodiment of the present invention, the world coordinates of the vertices of the footprint triangle are stored together with the local height map for the particular surface segment. The height map can be represented as a 2D array of height values, or generated parametrically. The union of all sub-bundles for all polygons in a triangle mesh is referred to as a boundle neighborhood of the entire surface. The bundle neighborhood, in effect, forms a bounding box for the particular surface being represented by the technique of the present invention. In general, it is unknown to which prism an arbitrary point (x,y,z) on a ray belongs; but since the division into prisms will often be fairly coarse and since fine geometric detail is handled within each prism, the number of tests required is typically not great. Using a standard bounding box test will eliminate all but a few prisms and tests can be done to find out quickly which of the remaining prisms the point (x,y,z) is inside.

Figure 5:
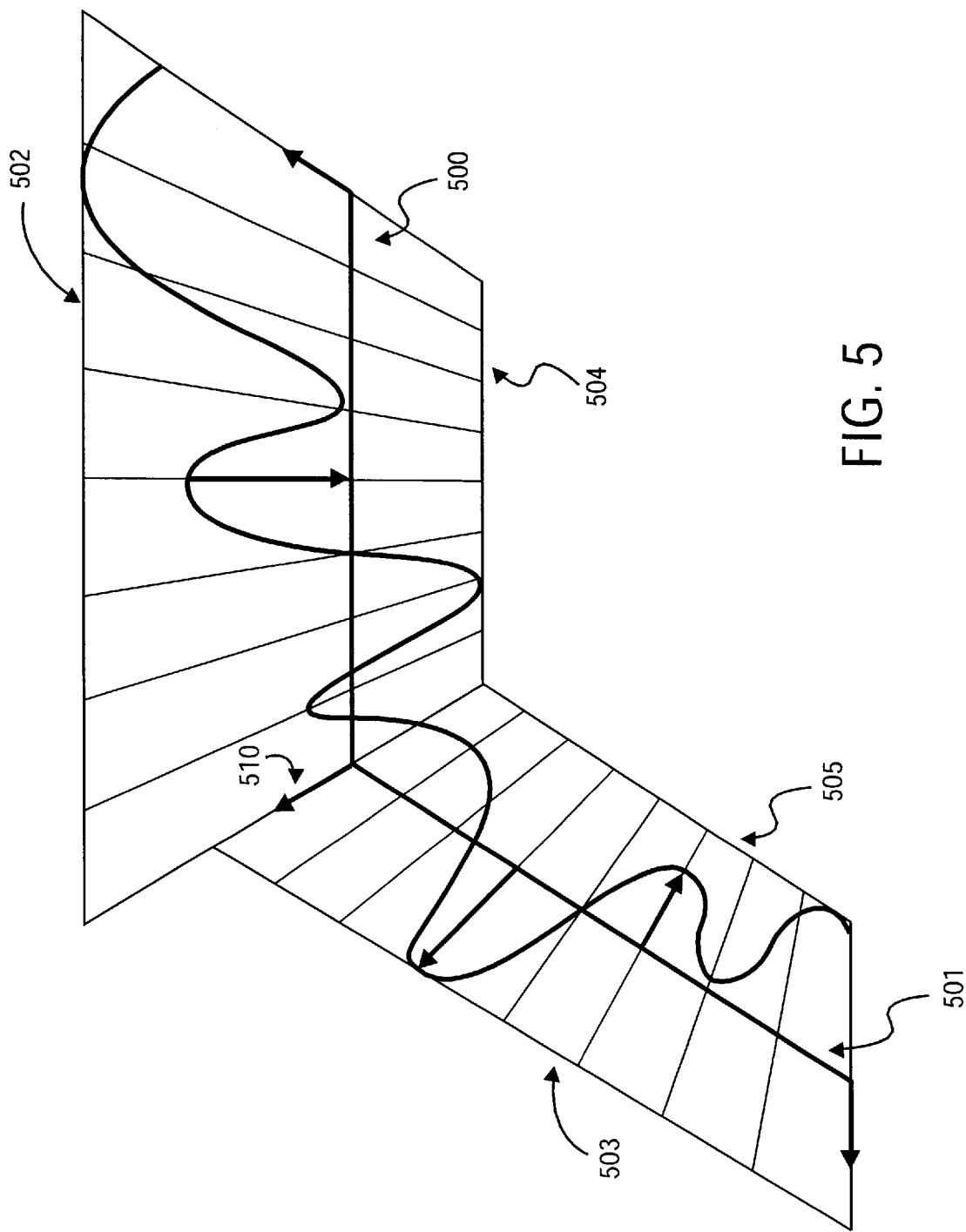
FIG. 5 is a two-dimensional representation of two contiguous surface segments approximated by two adjacent polygons sharing a vertex normal.

Furthermore, since the neighboring footprint polygons share the same vertex normals along their common edge, the modeling technique of the present invention is continuous across the boundaries and is thus capable of producing smooth transition from one footprint polygon to another footprint polygon. FIG. 5 illustrates how two adjacent footprint polygons 500 and 501 are represented using the technique of the present invention. Vertex normal 510 is a shared vertex normal for footprint polygons 500 and 501 and may be assigned by interpolation between them or by use of other data relevant to the object being modeled. Since each footprint polygon represents a different surface fragment, the maximum height datum 502 for footprint polygons 500 can differ from the maximum height datum 503 for footprint polygons 501. Similarly, the minimum height datum 504 and 505 can be different.

By using the modeling technique of this invention, a relatively coarse polygonal mesh can be used to approximate a complex surface. The mesh has a much lower vertex count than the polygons currently used to represent the surface at a similar level of detail. The reduction in vertex count will speed up the geometry phase of the rendering time. This keeps the bandwidth low until the rasterization phase where the shading of the polygons is performed. The overall effect is a re-balanced geometry phase, with the majority of the work moved into the rasterization phase where dedicated and optimized hardware can be built or modified to perform the task.

Rendering

Figure 9:
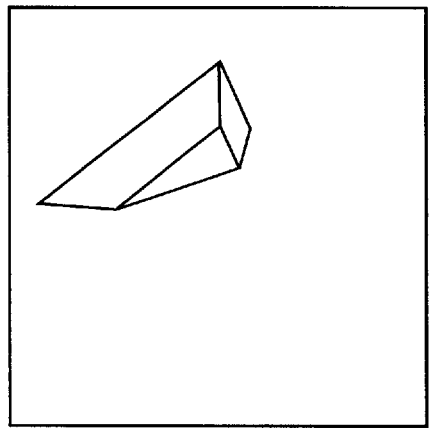
FIG. 9 illustrates the rendering to local buffers of three surface triangles of an octahedron and the final composite.
Figure 9:
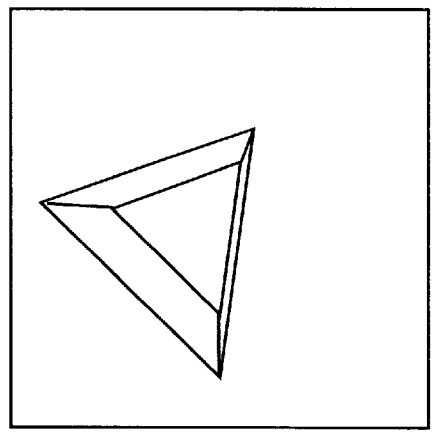
Figure 9:
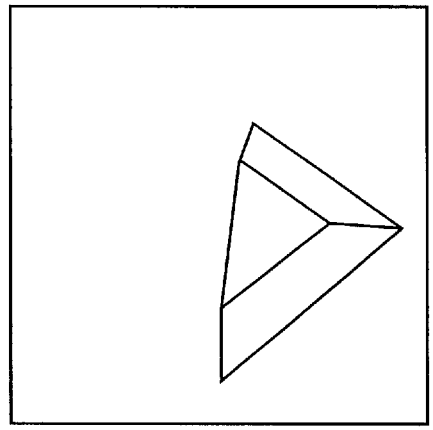
Figure 9:
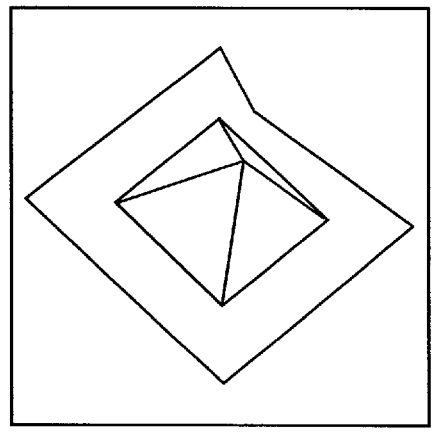

Rendering is a process of going from a database representation of a 3D object to a shaded 2D projection on a view surface. FIG. 4B illustrates a triangular polygon having edges 421, 422 and 423. The triangular polygon lies within a prism space. Referencing FIG. 4A, this prism space is bounded generally by the vertex normals 410, 411, 412, the minimum height datum 413 and the maximum height datum 414. The collection of all the points lying within this prism space is a sub-bundle. The geometry phase of the rendering pipeline will have to process the points in the sub-bundle to project a 3D surface segment onto a 2D screen. The projection can be either orthogonal or perspective. In orthogonal projection, a point on the 2D screen is identified with a point in the 3D scene by a line or a ray perpendicular to the 2D screen. The center of projection of the rays in orthogonal projection is at infinity. In perspective projection, the center of projection is explicitly specified. Perspective projection provides a visual effect of depth and realism. As illustrated in FIG. 4A, using perspective projection, there is a triangle 431 at the top, a triangle 432 at the bottom, and three quadrilaterals 433, 434 and 435 for the other three faces. Depending on the location of the viewer, some of these faces are visible and some are not. For each visible face, a local buffer is created to store the data associated with that visible face. FIG. 9 illustrates the rendering to local buffers of three surface triangles and the final composite.

Figure 6:
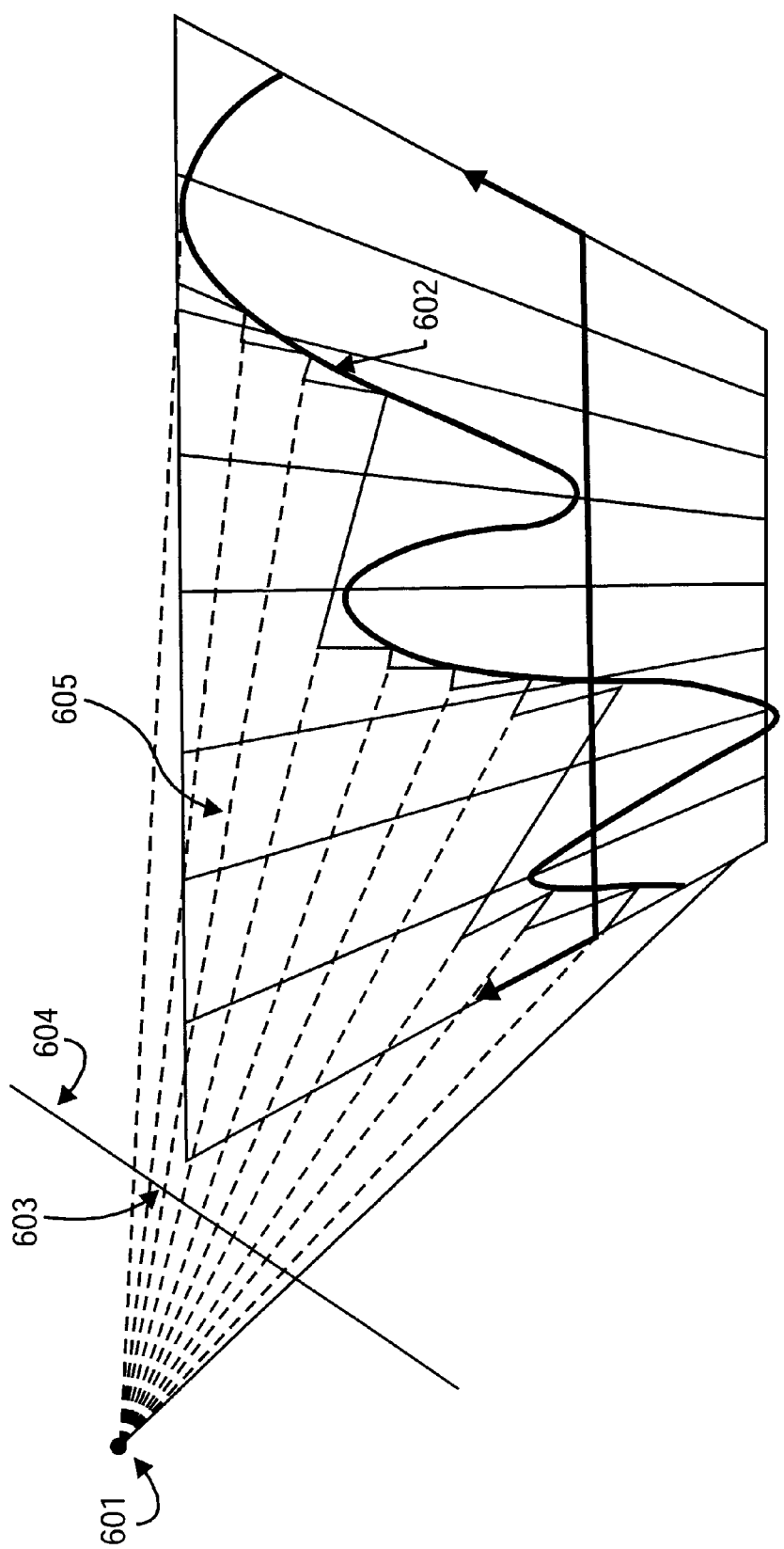
FIG. 6 illustrates (in 2D analogy) light rays from a viewpoint intersecting with a surface approximated by a polygon, forming a scan line.

FIG. 6 illustrates in 2D the scanning of one scan line along a polygon. In ray casting, one can define a ray through the eye position 601 for each pixel 605 along a scan line 604, and compute the first point at which the ray meets the object 602 being drawn. The first point 603 where a ray intersects with the surface determines the color, normal, lighting, etc., to be used in assigning a color to the pixel 605 for the image being drawn. The scan line 604 is shown as projected on a 2D screen. For each visible face and its corresponding projection, a scan direction in the pixel array that will contain the image is determined based on the geometric normals. The scan direction can be from bottom to top, from top to bottom, from left to right, or from right to left, whichever is closest to 'ascending' for the normals. It is also possible to permit diagonal scan directions. For convenience in exposition, we will refer to the scan direction as 'upward' in the discussion below, and use 'column' and 'row' to mean sequences of contiguous pixels in this direction and in the 'sideways' direction at right angles to it, respectively.

Ray casting, in general, involves a great deal of sampling along each ray in order to determine a point where the ray meets the object being drawn. The present invention uses a Lipshitz condition to reduce the number of samplings by starting the sampling at a position along a ray rather from the eye position. The selection of the scan direction is important because of the Lipshitz condition and because of the fact that the sampling of a point P on a ray moves forward in the direction of the surface. The Lipshitz condition is defined as follows. Take a function f(x), defined on a domain U with a metric d(x,y), such as scalars with the separation $|x-y|$, or $R^n$ with separation between $(x_0, x_1, \ldots x_n)$ and $(y_0, y_1, \ldots, y_n)$ defined by the square root of $((x_0-y_0)^2+(x_1-y_1)^2+\ldots+(x_n-y_n)^2)$ or the maximum of the set $\{|x_0-y_0|, |x_1-y_1|, \ldots, |x_n-y_n|\}$. Similarly, we need a metric (which we will also call d( , )) on the space where f takes values: in this application, we will be working with scalar-valued height functions defined on the 2D triangular domains of the prisms. The function f is called Lipshitz or Lipshitzian if there is some constant K such that:

d(f(x), f(y))<=K d(x,y) for all x and y in U.

Large values of K are more permissive, allowing the function to vary more steeply, than small ones. It is a requirement for the method here described that the function associating height data with footpoints must be Lipshitz, for a moderate value of K (whose exact value depends on the implementation details of the method: for example, allowing, a diagonal scan direction permits us to use a larger K). Models for rendering must satisfy this condition. For a fractal surface it can never be satisfied, for a smooth surface it always can be, though for a highly oscillatory case the advantage of the present method over a classical polygonal representation may be reduced, since the condition then increases the number of triangular elements required.

Figure 7:
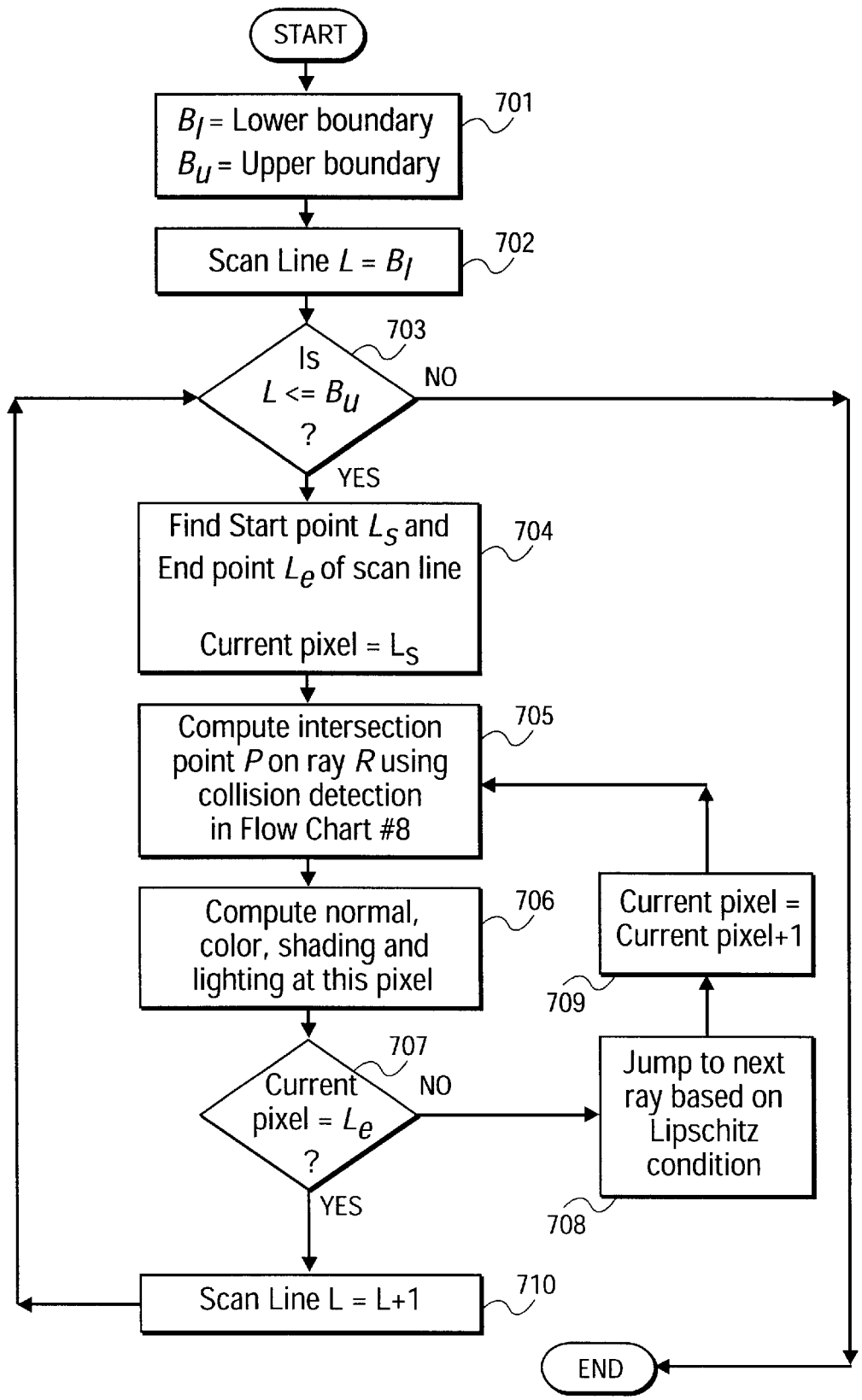
FIG. 7 illustrates a flow chart of a collision detection process using the technique of the present invention.

FIG. 7 is a flow chart illustrating an exemplary process that leads to the shading of a visible face as projected on a 2D screen. Scan lines, considered as vertical, are processed in succession, from neighbor to sideways neighbor, or if appropriate hardware is available, in parallel. For each scan line, pixels are processed incrementally, upward along the scan line. In Step 701, the lower and upper boundary of the visible face is determined. In order to start with the pixel where the scan line meets the lower boundary 702, and for every subsequent pixel up to and including the upper boundary 703, a determination is made of where that scan line enters the visible face and where it exits the visible face. This is done in step 704. The entry point is the first pixel of that scan line belonging to the visible face. It is called the start point. The exit point is the last pixel of that scan line belonging to the same visible face. It is called the end point. Each pixel along the scan line is successively processed, from the start point to the end point. Processing a pixel involves finding the surface point at which the ray through the viewpoint and that pixel first collides with the surface. In one embodiment, the collision detection process as shown in the flow chart of FIG. 8 may be used.

Using ray tracing, the intersection with the visible face of a ray from an eye point and the current pixel is determined, as shown in step 705. The intersection point is found when the computed pseudo-height datum for a point P on a ray is the same as the height datum for a point on the surface. Once the intersection point is determined, the normal color, shading and lighting for the pixel associated with that point is computed, as shown in step 706. In step 707, a comparison is done to see if the current pixel is the last pixel on the scan line, i.e., if the end point of the scan line is reached. If it is not the end point, then the procedure continues with a search for an intersecting point on an adjacent ray. Step 708 shows how the next outward ray is selected. Usually, the depth for an adjacent ray will be close to that of the current ray.

By exploiting the Lipshitz condition during the ray searching process, the sampling of that adjacent ray and the identification of its first point of intersection with the surface do not have to start from where the ray first encounters the sub-bundle. Using the collision point P of the previous ray and the Lipshitz constant K, we may compute an earliest possible point at which to begin the forward search. This is always near P; depending on the detailed geometrical situation, it may be nearer the viewpoint, or further away. Thus on average very few steps are required to detect the collision of the adjacent ray. In step 709, the pixel is incremented along the scan line toward the end point. If the end point of the current scan line is reached, then a next scan line is selected, as shown in step 710. This continues until all the pixels in each of the scan lines for the visible face are processed.

Figure 8:
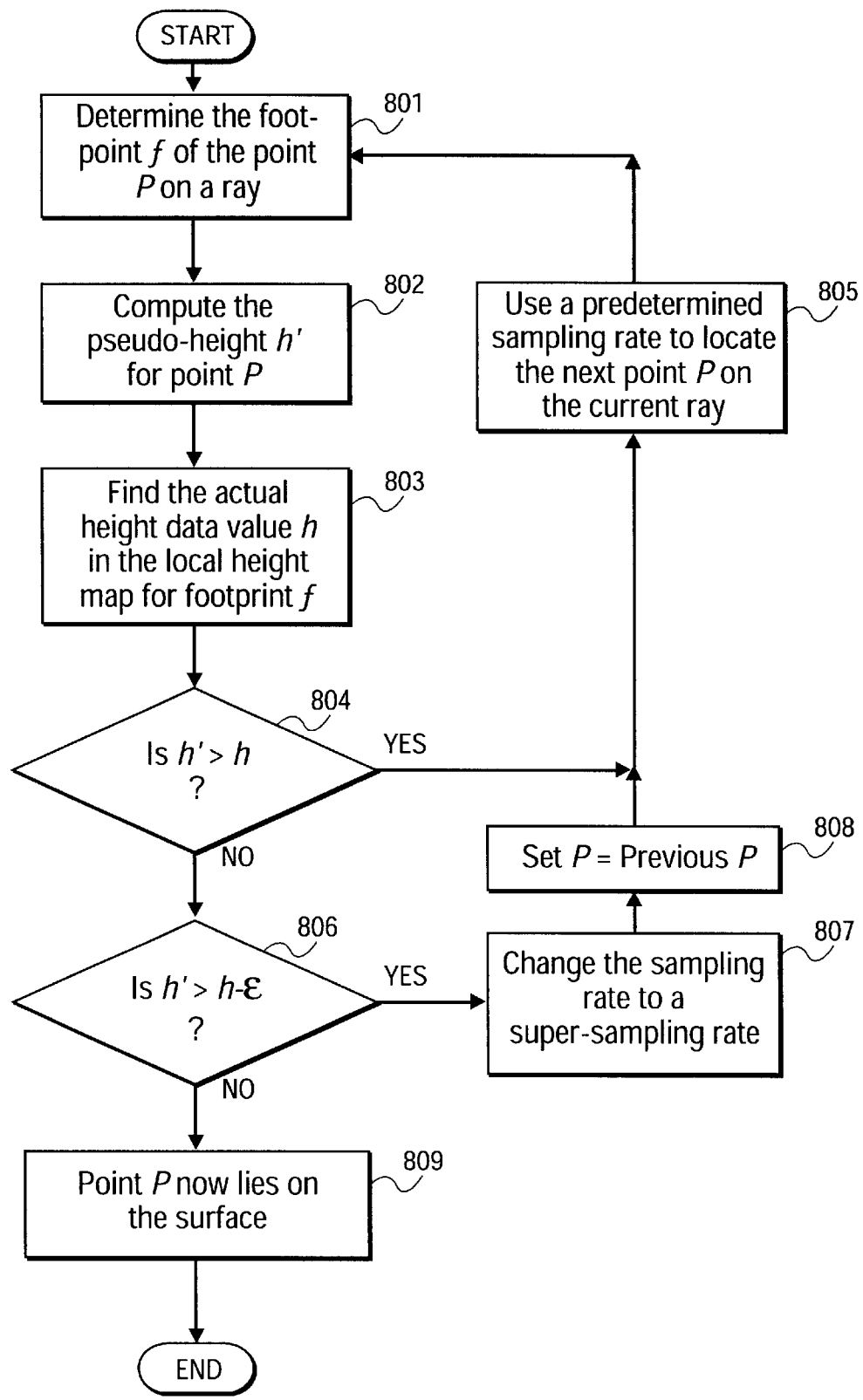
FIG. 8 illustrates a flow chart of a rendering process using the technique of the present invention.

Collision detection is used to determine a point where a ray meets the surface. FIG. 8 is a flow chart illustrating an exemplary process by which collision detection is calculated using ray tracing and the technique of the present invention. For a point P on a ray, tracing is done iteratively along the ray using a predetermined sampling rate until P is on the surface. However, if the ray passes through the prism space (the sub-bundle) without meeting the surface, then that ray is skipped and the next ray is processed. Finding the adjacent ray is done using the method indicated in step 708 of FIG. 7.

Referencing FIG. 8, when a point P within the prism space is being tested for its relation to the surface, a footpoint of P is calculated in step 801. At step 802, a corresponding height datum is calculated for P. Initially P can be somewhere above the surface segment. As such, the pseudo-height datum for P would be more than the pseudo-height datum for a point S on the surface having the same footpoint. Once the surface height datum is found from the local height map in step 803, the two values are compared in step 804. If they are within a preset tolerance $\epsilon$, the point P is considered to be on the surface, and the search process terminates for this ray. If the point P is above the surface, meaning that its pseudo-height exceeds the surface pseudo-height at S by more than $\epsilon$, a next candidate intersection point Q on the ray is determined using a predetermined sampling rate, as indicated in step 805. If the point Q is above the surface, continue to the next sample. If it is within tolerance $\epsilon$ of the surface, the search terminates for this ray. If the pseudo-height is less than the surface pseudo-height datum for the corresponding footpoint by more than $\epsilon$, as shown in step 806, the current sampling rate took the testing past the surface. It is then necessary to change the sampling rate to a super-sampling process so that a point P' on the ray is selected such that it would not be past the surface. This is done in step 807. Using the previous location of P, as shown in step 808, the process continues with the new sampling rate. Alternatively, a candidate point P' is interpolated between P and Q such that if h varied linearly between their footpoints, then P' would be exactly on the surface. If it is below, repeat the interpolation between P and P'; if it is above, repeat the interpolation between P' and Q. By iterating the change in sampling rate, by iterating the interpolation, or by other methods known to those skilled in the art, the process rapidly reaches a point R where the pseudo-height is within $\epsilon$ of the surface pseudo-height datum for the corresponding footpoint. Once P is on the surface, an intersection point is found and the process is completed, as shown in step 809. The pixel values can then be computed as in step 706 of FIG. 7.

The lighting calculations for this computation generally require a value for the normal vector of the surface at the intersection point (as distinct from the interpolated normal to the polygonal mesh, at the corresponding footpoint). This vector is the unit vector in the direction of the cross-product of the gradient vector, or tangent vector to the surface in the direction of its greatest rate of increase of height, with the cross-product of the gradient vector and the geometric normal to the footprint polygon, since the latter and the gradient are non-collinear tangent vectors (except where the gradient is zero, in which case the geometric normal to the footprint polygon is also the required normal to the surface). The gradient vector may be estimated from the sample heights stored for the surface, or computed exactly where the surface height is given as a polynomial or other procedural function of footpoint position.

By storing two or more sets of height values for each polygon, we may store multiple related surfaces, such as, for example, the concentric boundaries between an unripe coconut and the air, along with the inner boundaries between the coir and the hard shell, between the shell and the solid flesh of the coconut, and between the flesh and the coconut juice inside it. By this means we can create an image of one or more of the layers between these surfaces, by rendering selected surfaces. Since, for any point near the polygonal mesh, we may compare its pseudo-height with those of the surfaces at the associated footpoint, we may quickly determine which layer it is in, and assign corresponding properties, such as, for example, color, if a clipping plane causes a ray to meet such a point before it meets an exterior point, for rendering.

Figure 10:
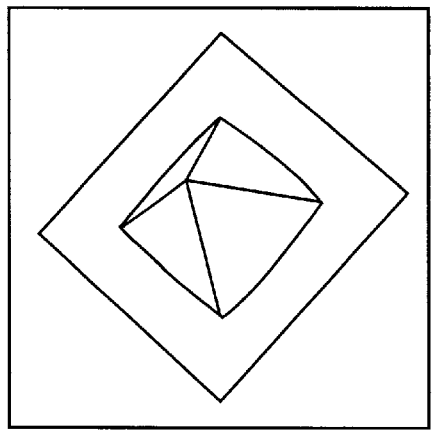
FIGS. 10A, 10B, 10C, and 10D illustrate the application of the present invention in rendering an octahedron, a sphere, a bumpy sphere and a rippled sphere, all having similar rendering time.
Figure 10:
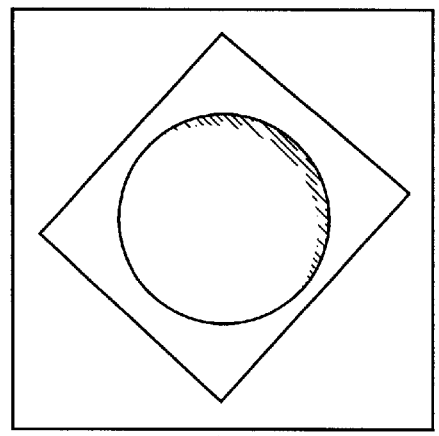
Figure 10:
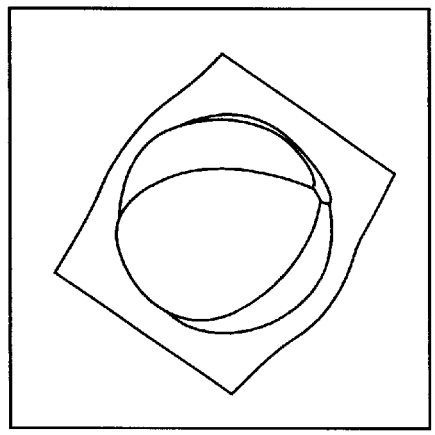
Figure 10:
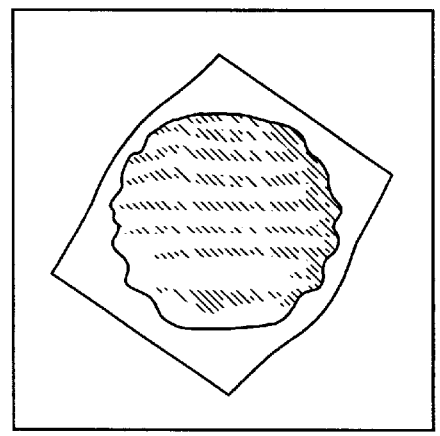

As an application of the present invention, eight triangles arranged in an octahedron, as in FIG. 10A, are sufficient to define a sphere as shown in FIG. 10B when proper height maps are used. Since the sphere is all-around symmetrical, only one height map is used. Those eight triangles were also sufficient to define a sphere with ripples, as shown in FIG. 10C and FIG. 10D. The rippled sphere in FIG. 10C also requires only one height map. If the ripples moved, losing symmetry, we would require one height map per triangle: still only eight in all. In contrast, it would require about two thousand triangles to achieve comparable smoothness with conventional polygon graphics. It should be noted that, even though the surfaces of each sphere have different levels of complexity, the rendering times for all the spheres are nearly the same since the triangular mesh is the same for FIG. 10A to FIG. 10D. Only the height maps are different.

Figure 11:
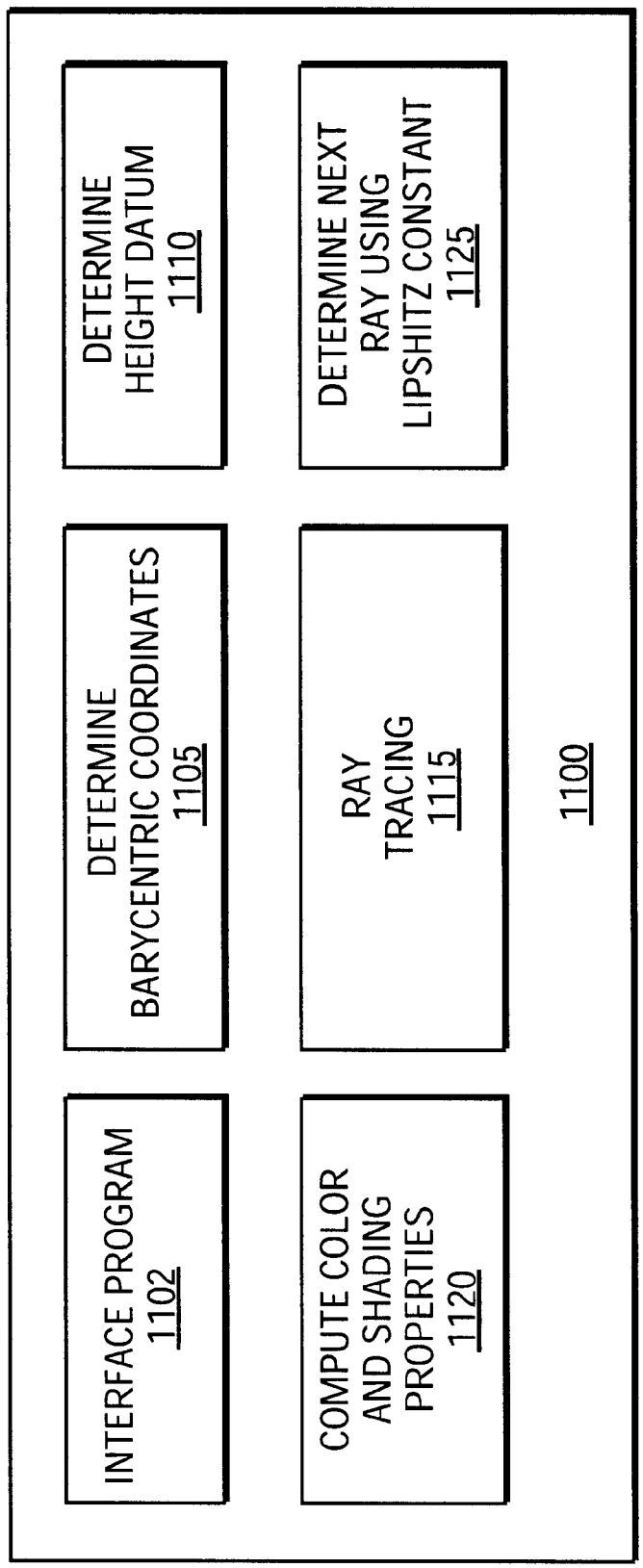
FIG. 11 illustrates an embodiment of a computer-readable medium containing programming instructions for performing the method of the present invention.

FIG. 11 illustrates an embodiment of a computer-readable medium 1100 containing various sets of instructions, code sequences, configuration information, and other data used by a computer or other processing device. The embodiment illustrated in FIG. 11 is suitable for use with the method for modeling and rendering complex surface described in the present invention. The various information stored on medium 1100 is used to perform various data processing operations, such as, for example, determining barycentric coordinates of footpoints 1105, determining height datum 1110, tracing ray 1115, computing color, shading and other properties 1120, determining a next ray using the Lipshitz constant 1125, and so on. Computer-readable medium 1100 is also referred to as a processor-readable medium. Computer-readable medium 1100 can be any type of magnetic, optical, or electrical storage medium including a diskette, magnetic tape CD-ROM, memory device, or other storage medium.

Computer-readable medium 1100 includes interface code 1102 that controls the flow of information between various devices or components in the computer system. Interface code 1102 may control the transfer of information within a device (e.g., between the processor and a memory device), or between an input/output port and a storage device. Additionally, interface code 1102 may control the transfer of information from one device to another.

The local height map technique of the present invention uses rays economically to achieve rapid rendering and collision detection for mutable objects with rich geometric detail. This technique is compatible with the current graphics pipeline. By reducing the burden on the CPU during the geometry phase, this technique alleviates one of the major problems facing graphics systems today as models are becoming increasingly complex. Most of the existing 3D polygonal models can be modified to add surface detail using the modeling technique of the present invention. These models can be decimated to reduce geometric complexity and then the lost detail added back as displacements. This will reduce the overall size and complexity of the model, and will at the same time increase the rendering speed without sacrificing surface quality.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method of modeling a three-dimensional surface, comprising:

approximating a three-dimensional surface with a polygonal mesh, each polygon of the polygonal mesh containing a plurality of footpoints;

associating a normal vector with each vertex of the polygon;

interpolating a normal vector at each footpoint from the vertex normals of the polygon containing the footpoint; and associating a height with each point on the three-dimensional surface in a neighborhood of the corresponding polygon, the height representing, a signed distance from a footpoint along the corresponding interpolated normal vector to the point on the three-dimensional surface.

2. The method of claim 1, wherein each polygon is triangular having three vertices.

3. The method of claim 1, wherein associating a height with each point on the three-dimensional surface comprises:

determining the height of the point on the three-dimensional surface by finding a root of a cubic equation that expresses the point lying in a plane at that height, the point being above its corresponding footpoint; and storing the height for each footpoint in the respective polygon.

4. The method of claim 3, wherein the heights are stored at a finite list of specified corresponding footpoints.

5. The method of claim 1, wherein each footpoint is represented in a barycentric coordinate system of the triangle containing the footpoint, and wherein the barycentric coordinates of the footpoint are used in interpolating the normal vector at each footpoint.

6. The method of claim 1, wherein the height of the point on the three-dimensional surface is computed using coefficients corresponding to the triangle containing the corresponding footpoint.

7. The method of claim 1, wherein the height of the point on the three-dimensional surface is interpolated from the heights at the finite list of specified corresponding footpoints.

8. The methods of claim 1, wherein the three-dimensional surface comprises of a plurality of surface segments in the neighborhood of the same polygon, and wherein for each foot point there is a height for each of the plurality of surface segments.

9. The methods of claim 1, wherein the three-dimensional surface is a thick surface in the neighborhood of the same polygon, the thick surface having an inner surface and an outer surface, and wherein for each foot point there is a height for the inner surface and a height for the outer surface.

10. A method of rendering, comprising:

specifying a three-dimensional surface to be rendered by specifying a plurality of footpoints and a plurality of corresponding surface heights, the surface height being of a surface point corresponding to the footpoint, the footpoint being in a polygon used to approximate the surface;

computing display properties for a pixel in an image of the surface by finding a first point of collision of a first ray with the surface through the pixel in a viewing direction; and finding a second point of collision of a second ray with the surface usinig a Lipshitz constant.

11. The method of claim 10, wherein each polygon is triangular.

12. The method of claim 10, wherein each footpoint is represented in a barycentric coordinate system of the triangle containing the footpoint.

13. The method of claim 10, wherein the surface height is stored for each corresponding footpoint in the respective polygon.

14. The method of claim 10, wherein finding the first point of collision comprises:

determining a first point on the first ray that lie within sub-bundles of the surface;

determining the sub-bundle within which the first point lies, finding the height corresponding to the first point and the footpoint in the sub-bundle; and comparing the height corresponding to the first point with the surface height at the footpoint.

15. The method of claim 14, wherein finding the first point of collision further comprises sampling along the first ray to find a second point if the height corresponding to the first point is above the surface height; and finding a first transition between a height above and a height below the surface height.

16. The method of claim 15, wherein sampling comprises stepping at a closer spacing from a last sample found to be above the surface, until a point is found such that the height of the point is within a pre-specified tolerance of the surface height at that footpoint.

17. The method of claim 14, wherein sampling comprises interpolating inductively between the last sample found to be above the surface and a first sample found to be below the surface until a point is found such that the height is within the pre-specified tolerance of the surface height at the footpoint.

18. The method of claim 10, wherein the display properties comprises of colors and lighting, and wherein computing the lighting comprises evaluating a gradient of a height function at the footpoint.

19. The method of claim 18, wherein evaluating gradient comprises:

storing the gradients at a list of specified footpoints; and interpolating the gradients at the footpoints between the specified footpoints.

20. The method of claim 18, wherein computing the lighting further comprises evaluating a geometric normal to the surface at the point above the footpoint as a unit vector orthogonal to the surface tangents given by the gradient for that footpoint.

21. The method of claim 10, wherein finding the second point of collision comprises exploiting a sufficiently small Lipshitz constant bounding a ratio between separation of the surface heights and the distance between the corresponding footpoints, the Lipshitz constant previously determined and stored in association with the surface or with each sub-bundle.

22. The method of claim 21, wherein finding the second point of collision further comprises using the Lipshitz constant to find a point near the first point of collision where it is sufficient to begin sampling the second ray, the second ray being a neighboring ray with the first ray.

23. A computer readable medium containing instructions which, when executed in a processing system, causes the processing systems to perform a method for modeling a three-dimensional surface, comprising:

approximating a three-dimensional surface with a polygonal mesh, each polygon of the polygonal mesh containing a plurality of footpoints;

associating a normal vector with each vertex of the polygon;

interpolating a normal vector at each footpoint from the vertex normals of the polygon containing the footpoint; and associating a height with each point on the three-dimensional surface in a neighborhood of the corresponding polygon, the height representing a signed distance from a footpoint along the corresponding interpolated normal vector to the point on the three-dimensional surface.

24. The computer readable medium of claim 23, wherein each polygon is triangular having three vertices.

25. The computer readable medium of claim 23, wherein associating a height with each point on the three-dimensional surface comprises:

determining the height of the point on the three-dimensional surface by finding a root of a cubic equation that expresses the point lying in a plane at that height, the point being above its corresponding footpoint; and storing the height for each footpoint in the respective polygon.

26. The computer readable medium of claim 25, wherein the heights are stored at a finite list of specified corresponding footpoints.

27. The computer readable medium of claim 23, wherein each footpoint is represented in a barycentric coordinate system of the triangle containing the footpoint, and wherein the barycentric coordinates of the footpoint are used in interpolating the normal vector at each footpoint.

28. The computer readable medium of claim 23, wherein the height of the point on the three-dimensional surface is computed using coefficients corresponding to the triangle containing the corresponding footpoint.

29. The computer readable medium of claim 23, wherein the height of the point on the three-dimensional surface is interpolated from the heights at the finite list of specified corresponding footpoints.

30. The computer readable medium of claim 23, wherein the three-dimensional surface comprises of a plurality of surface segments in the neighborhood of the same polygon, and wherein for each foot point there is a height for each of the plurality of surface segments.

31. The computer readable medium of claim 23, wherein the three-dimensional surface is a thick surface in the neighborhood of the same polygon, the thick surface having an inner surface and an outer surface, and wherein for each foot point there is a height for the inner surface and a height for the outer surface.

32. A computer readable medium containing instructions which, when executed in a processing system, causes the processing systems to perform a method for rendering a three-dimensional surface, comprising:

specifying a three-dimensional surface to be rendered by specifying a plurality of footpoints and a plurality of corresponding surface heights, the surface height being of a surface point corresponding to the footpoint, the footpoint being in a polygon used to approximate the surface;

computing display properties for a pixel in an image of the surface by finding a first point of collision with the surface of a first ray through the pixel in a viewing direction; and finding a second point of collision of a second ray with the surface using a Lipshitz constant.

33. The computer readable medium of claim 32, wherein each polygon is triangular.

34. The computer readable medium of claim 32, wherein each footpoint is represented in a barycentric coordinate system of the triangle containing the footpoint.

35. The computer readable medium of claim 32, wherein the surface height is stored for each corresponding footpoint in the respective polygon.

36. The computer readable medium of claim 32, wherein finding the first point of collision comprises:

determining a first point on the first ray that lie within sub-bundles of the surface;

determining the sub-bundle within which the first point lies, finding the height corresponding to the first point and the footpoint in the sub-bundle; and comparing the height corresponding to the first point with the surface height at the footpoint.

37. The computer readable medium of claim 36, wherein finding the first point of collision further comprises sampling along the first ray to find a second point if the height corresponding to the first point is above the surface height; and finding a first transition between a height above and a height below the surface height.

38. The computer readable medium of claim 37, wherein sampling comprises stepping at a closer spacing from a last sample found to be above the surface, until a point is found such that the height is within a pre-specified tolerance of the surface height at that footpoint.

39. The computer readable medium of claim 36, wherein sampling comprises interpolating inductively between the last sample found to be above the surface and a first sample found to be below the surface until a point is found such that the height is within the pre-specified tolerance of the surface height at the footpoint.

40. The computer readable medium of claim 32, wherein the display properties comprises of colors and lighting, and wherein computing the lighting comprises evaluating a gradient of a height function at the footpoint.

41. The computer readable medium of claim 40, wherein evaluating gradient comprises:

storing the gradients at a list of specified footpoints; and
interpolating the gradients at the footpoints between the specified footpoints.

42. The computer readable medium of claim 40, wherein computing the lighting further comprises evaluating a geometric normal to the surface at the point above the footpoint as a unit vector orthogonal to the surface tangents given by the gradient for that footpoint.

43. The computer readable medium of claim 32, wherein finding the second point of collision comprises exploiting a sufficiently small Lipshitz constant bounding a ratio between separation of the surface heights and the distance between the corresponding footpoints, the Lipshitz constant previously determined and stored in association with the surface or with each sub-bundle.

44. The computer readable medium of claim 43, wherein finding the second point of collision further comprises using the Lipshitz constant to find a point near the first point of collision where it is sufficient to begin sampling the second ray, the second ray being a neighboring ray with the first ray.

45. An apparatus, comprising:

means for approximating a three-dimensional surface with a polygonal mesh, each polygon of the polygonal mesh containing a plurality of footpoints;

means for associating a normal vector with each vertex of the polygon;

means for interpolating a normal vector at each footpoint from the vertex normals of the polygon containing the footpoint; and means for associating a height with each point on the three-dimensional surface in a neighborhood of the corresponding polygon, the height representing a signed distance from a footpoint along the corresponding interpolated normal vector to the point on the three-dimensional surface.

46. The apparatus of claim 45, wherein means for associating a height with each point on the three-dimensional surface comprises:

means for determining the height of the point on the three-dimensional surface; and means for storing the height for each footpoint in the respective polygon.

47. The apparatus of claim 46, wherein means for determining the height of a point comprises means for finding a root of a cubic equation that expresses the point lying in a plane at that height, the point being above its corresponding footpoint.

48. The apparatus of claim 46, wherein means for determining the height of a point comprises means for interpolating from the heights at a finite list of specified corresponding footpoints.

49. The apparatus of claim 46, wherein means for determining the height of a point comprises means for means for computing the height using coefficients corresponding to the triangle containing the corresponding footpoint.

50. The apparatus of claim 45, wherein the polygon is triangular, wherein each footpoint is represented in barycentric coordinate system of the triangle containing the footpoint, wherein the barycentric coordinates of the footpoint are used in interpolating the normal vector at each footpoint, and wherein the heights are stored at a finite list of specified corresponding footpoints.

51. The apparatus of claim 45 further comprising means for rendering the surface modeled by the means for approximating the surface using triangular polygons, barycentric coordinates, footpoints, and surface heights.

52. The apparatus of claim 45, wherein means for rendering comprises:

means for detecting a first point of collision of a first ray and the surface;

means for computing display properties for a pixel in an image of the surface at the first point of collision; and means for finding a second point of collision of a second ray and the surface using a Lipshitz constant.

53. The apparatus of claim 52, wherein means for detecting the first point of collision comprises:

means for determining a first point on the first ray that lie within sub-bundles of the surface;

means for determining the sub-bundle within which the first point lies, means for finding the height corresponding to the first point and the footpoint in the sub-bundle; and means for comparing the height corresponding to the first point with the surface height at the footpoint.

54. The apparatus of claim 53, wherein means for detecting the first point of collision further comprises:

means for sampling along the first ray to find a second point if the height corresponding to the first point is above the surface height; and means for finding a first transition between a height above and a height below the surface height.

55. A system comprising:

a processor comprises of a first logic to model a three-dimensional surface and a second logic to render the three-dimensional surface, the first logic configured to approximate the three-dimensional surface with a polygonal mesh, each polygon of the polygonal mesh containing a plurality of footpoints, each footpoint associated with a surface height, the surface height representing a signed distance from the footpoint along the corresponding interpolated normal vector to a point on the three-dimensional surface, the second logic configured to detect a first collision point of a first ray and the surface, compute display properties for a pixel in an image of the surface at the first collision point, and detect a second collision point of a second ray and the surface using a Lipshitz constant; and a storage device coupled with the processor, the storage device configured to store data comprising of surface heights, polygon vertex normal vectors, and the Lipshitz constant.

56. The system of claim 55 wherein the interpolated normal vector of the footpoint is interpolated from the vertex normal vectors of the polygon containing the footpoint.

57. The system of claim 55, wherein the surface height is determined by finding a root of a cubic equation that expresses the point lying in a plane at that height.

58. The system of claim 55, wherein the polygon is triangular, wherein each footpoint is represented in a barycentric coordinate system of the triangle containing the footpoint, wherein the barycentric coordinates of the footpoint are used in interpolating the normal vector at each footpoint, and wherein the surface heights are stored at a finite list of specified corresponding footpoints.

59. The system of claim 55, wherein detecting the first collision point comprises:

determining a first point on the first ray that lie within sub-bundles of the surface;

determining the sub-bundle within which the first point lies, finding the height corresponding to the first point and the footpoint in the sub-bundle; and comparing the height corresponding to the first point with the surface height at the footpoint.

60. The system of claim 59, wherein finding the first point of collision further comprises sampling along the first ray to find a second point if the height corresponding to the first point is above the surface height;

finding a first transition between a height above and a height below the surface height; and sampling at a closer spacing from the point whose height is above the surface height until a point is found such that the height is within a pre-specified tolerance of the surface height at the footpoint.

* * * * *

UNITED STATES PATENT AND TRADEMARK OFFICE
CERTIFICATE OF CORRECTION

PATENT NO. : 6,441,816 B1
DATED : August 27, 2002
INVENTOR(S) : Nguyen et al.

It is certified that error appears in the above-identified patent and that said Letters Patent is hereby corrected as shown below:

Column 1,
Line 34, delete "hut", insert -- but --.

Column 3,
Line 17, delete "At", insert -- at --.

Signed and Sealed this

Twenty-eighth Day of January, 2003

JAMES E. ROGAN
*Director of the United States Patent and Trademark Office*